US012666095B2

(12) United States Patent
Giladi

(10) Patent No.: US 12,666,095 B2
(45) Date of Patent: Jun. 23, 2026

(54) DATA OBJECTS FOR CONTENT DISTRIBUTION

(71) Applicant: Comcast Cable Communications, LLC, Philadelphia, PA (US)

(72) Inventor: Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 189 days.

(21) Appl. No.: 18/066,121

(22) Filed: Dec. 14, 2022

(65) Prior Publication Data

US 2024/0205470 A1     Jun. 20, 2024

(51) Int. Cl.
H04N 21/2343 (2011.01)
H04N 21/2662 (2011.01)
(52) U.S. Cl.
CPC . H04N 21/234363 (2013.01); H04N 21/2662 (2013.01)

(58) Field of Classification Search
CPC ................... H04N 21/234363; H04N 21/2662
See application file for complete search history.

(56) References Cited

U.S. PATENT DOCUMENTS

| | | | |
|---|---|---|---|
| 2020/0107056 A1* | 4/2020 | Giladi | H04N 21/8586 |
| 2020/0351013 A1* | 11/2020 | Yang | H03M 13/6356 |
| 2022/0210487 A1* | 6/2022 | Hassler | H04N 21/2225 |
| 2022/0329641 A1* | 10/2022 | Giladi | H04N 21/44029 |

\* cited by examiner

*Primary Examiner* — Yassin Alata
(74) *Attorney, Agent, or Firm* — BakerHostetler

(57) ABSTRACT

Methods and systems are described for providing content are disclosed. The content may be encoded into a plurality of different versions, such as different representations of the content at different resolutions. A plurality of data objects may be determined for transmission of the content. A data object may include a portion, such as a single frame or group of frames, from each of the versions. The plurality of data objects may be sent to one or more locations in a network. The data objects may be processed to construct content segments which may be sent to users for consumption.

20 Claims, 7 Drawing Sheets

400

402

Receive, by a first device associated with a content delivery network, a plurality of data objects each comprising a plurality of frames of content associated with different versions of the content

404

Generate, based on the plurality of data objects, at least one content segment

406

Send, to a computing device, the at least one content segment

DATA OBJECTS FOR CONTENT DISTRIBUTION

BACKGROUND

A service provider may provide content to customers through a system that involves both ingesting content from content sources and delivery of content to a variety of geographic locations. Delivery of the content through a content distribution and/or access network may be expensive, consuming bandwidth and processing power. Thus, there is a need for more sophisticated processes for management of content.

SUMMARY

Methods and systems for providing content are disclosed. An ingest service may receive content from a variety of content sources. The ingest service may be used to encode content into a plurality of different versions, such as different representations of the content. Each representation may be the same content at a different resolution (e.g., SD, HD, 4k). The ingest service may organize the content as a plurality of data objects. Each data object may comprise a frame (e.g., or multiple frames less than a full content segment) from each of the different versions of the content. Additional information may be added to the data object, such as forward error correction information and header information indicating the location in the data object of the data for each representation. The plurality of data objects may be sent to various locations and/or devices in the content distribution and/or access network. The devices receiving the plurality of data objects may use the plurality of data objects to determine content segments to deliver to users requesting content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
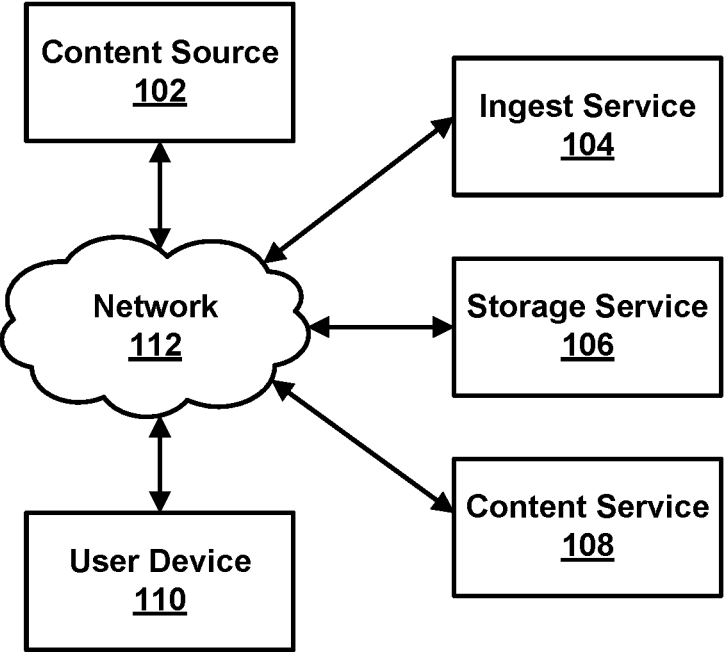
FIG. 1 shows an example system.

Video services using adaptive streaming technologies, such as Moving Picture Experts Group (MPEG) Dynamic Adaptive Streaming over HTTP (DASH) or Apple HTTP Live Streaming (HLS) typically publish content segments on a content server (e.g., origin server). The content server may comprise a Hypertext Transfer Protocol (HTTP) server from which user devices (e.g., or players on devices) request content segments for play back. There is a need for a protocol to transfer these content segments from an encoder generating the content segments to various locations, such as one or more content servers in a content distribution and/or access network.

Many conventional systems use Moving Picture Experts Group 2 transport stream (MPEG-2 TS) packed directly into a User Datagram Protocol (UDP) packet. This approach has major drawbacks. Firstly, this conventional approach requires MPEG-2 TS support for all newer media formats while no streaming device or MPEG-2 TS player such as a set-top box can support them. Secondly, UDP is an unreliable transport protocol, hence there is no guarantee that all packets sent by the transcoder will arrive at the origin. Lastly, segment boundaries and additional metadata for generation of DASH and HLS media presentation descriptions (MPDs) may be needed.

More modern contribution protocols, such as secure reliable transport (SRT) and Reliable Internet Stream Transport (RIST), may address some of the above issues, but both of these protocols do not send manifest type of metadata. Thus, there is a need for an out-of-band mechanism providing the necessary metadata. Moreover, neither MPEG-2 TS nor SRT and RIST natively support the notion of ISO Base Media File Format (ISO-BMFF)/Common Media Application Format (CMAF) segments and chunks requiring ill-supported extensions (e.g., EBP (encoder boundary point) or TEMI boundary signaling in MPEG-2 TS).

One approach is to use DASH Industry Forum (DASH-IF) Live Ingest protocol, which uses HTTP POST requests to transfer CMAF segments or (in case of low-latency CMAF) chunks from a distribution encoder to a package. Interface 2 of this protocol allows sending the DASH and HLS manifests along with segments. The protocol is limited to HTTP/1.1 (and hence the TCP transport protocol), and therefore it can only be point-to-point (e.g., no multicast), and suffers from unpredictable delays (e.g., some due to retransmissions and packet loss) and throughput. These may be tolerable with segments of longer durations (e.g., 10) seconds) but create issues with low-latency modes where chunk duration can be less than 50 ms and retransmissions are undesirable.

According to the present techniques, the ROUTE/DASH protocol may be used, for example, for Advanced Television Systems Committee (ATSC) 3.0 transmission of broadcast content in DASH format (e.g., more precisely—ISO-BMFF media segments and DASH media presentation description (MPD)). The disclosed techniques may use ROUTE/DASH as a part of an ingest protocol. ROUTE/DASH may be used with forward error correction (FEC) to improve transmission reliability. From the FEC point of view; the transmission may be in units of "symbols", where "source symbols" represent the actual data intended to be transmitted, while "repair symbols" are data units needed by the FEC algorithm in order to recover from packet loss. These repair symbols may allow use of systemic fountain codes as the FEC mechanism. A configurable number of "repair symbols" can be included in the transmission to recover from a packet loss. These "repair symbols" may be transmitted along with "source symbols" and may be an overhead. This overhead may be smaller if larger data objects protected by the fountain code class of FEC algorithms are used.

The disclosed techniques may comprise generating a plurality of data objects for delivery of content. The data objects may be referred to as "shards." Content, such as video/audio content, may be encoded into a plurality of different versions of the content, such as different resolutions (e.g., 480p, 720p, 1080p). A data object may have frames from each of (e.g., or a subset of) the plurality of different versions of the content. A data object may be generated by copying "chunks" of data from each of the plurality of different versions. A chunk of data may vary in size according to system specifications. A chunk may include less than a frame, a single frame, multiple frames, and/or the like of data. Each chunk may be a portion of a content segment (e.g., a two second content segment) for a particular version of the content (e.g., a particular representation). Thus, a single data object may comprise portions of different content segments for different representations. A chunk of data, from a version of the content, stored in a data object may not be playable by itself and/or may have to be combined with portions of the version of the content from other data objects to be playable. The content may be sent as a plurality of data objects to a computing device, such as an edge device in a content delivery network. The computing device may generate content segments for a particular version of the content by combining portions of the version from different data objects. If a request for a particular version of the content is received, portions of the requested version of the content may be obtained from different data objects and combined to form segments of the content. The segments of the content may be sent to a user device that sent the request.

The disclosed techniques allow for greater efficiency in transmission of the segments of content. For example, forward error correction may be more efficiently applied for transmission of the data objects from one device to another (e.g., in a content delivery system). Repair symbols may be added to the data objects to allow forward error correction at the destination. Repair symbols add overhead which may be excessive, especially if separately applied to individual data chunks, which may be small in some implementations. Accordingly, having larger data objects that comprise multiple chunks of data from different representations allows for less data being used for repair symbols, resulting in more efficient and reliable data transmission.

FIG. 1 is a block diagram showing an example system 100 for managing content. The system 100 may comprise one or more of a content source 102, an ingest service 104, a storage service 106, a content service 108, and a user device 110. The content source 102, the ingest service 104, the storage service 106, the content service 108, the user device 110, or a combination thereof may be communicatively coupled via a network 112.

The network 112 may comprise a content distribution and/or access network. The network 112 may facilitate communication via one or more communication protocols. The network 112 may comprise fiber, cable, a combination thereof. The network 112 may comprise wired links, wireless links, a combination thereof, and/or the like. The network 112 may comprise routers, switches, nodes, gateways, servers, modems, and/or the like.

The ingest service 104, the storage service 106, the content service 108, or a combination thereof may be implemented by one or more computing nodes. A computing node may comprise a virtual machine, processor, computing device, or a combination thereof. The ingest service 104, the storage service 106, and/or the content service 108 may each be implemented on separate computing nodes (e.g., on separate computing devices). The ingest service 104, the storage service 106, and/or the content service 108 may each be implemented on the same computing node (e.g., on the same computing device). The ingest service 104, the storage service 106, and/or the content service 108 may implemented by a plurality of computing nodes. The plurality of computing nodes may be geographically dispersed (e.g., to allow efficient access to content). The ingest service 104, the storage service 106, and/or the content service 108 may be duplicated at various locations in the network 112.

The content source 102 may be configured to supply content, such as one or more content streams, content files, and/or the like. The content may comprise one or more of media content, video, audio, text, a combination thereof, and/or the like. The content source 102 may comprise a content channel, a content stream source, a content file source, and/or the like. The content source 102 may be accessed by the ingest service 104 to determine one or more content assets. The ingest service 104 may be configured to receive content.

The ingest service 104 may comprise a transcoder (e.g., encoder) configured to encode, encrypt, compress, and/or the like the content from the content source 102. The ingest service 104 may be configured to package the content, segment the content, and/or the like. The ingest service 104 may generate (e.g., by subdividing and/or encoding the content) a plurality of content frames (e.g., or groups of frames) of the content.

The ingest service 104 may be configured to determine (e.g., encode, transcode) a plurality of versions of the content. Each of the plurality of version may have a corresponding resolution of a plurality of different resolutions. The plurality of different resolutions may comprise one or more of standard definition (e.g., 480p), high definition (e.g., 720p, 1080p), or ultra high definition (e.g., 4k). The plurality of versions of the content may comprise a plurality of representations of an adaptation set of a content stream.

The ingest service 104 may be configured to generate a plurality of data objects. A data object may comprise a plurality of frames. Each of the plurality of frames may be associated with a different version of the plurality of versions. The plurality of frames may be grouped (e.g., selected) based on time. Each of the plurality of frames may be associated with one or more of the same time-point, time window; or content stream time. Each of the plurality of frames may be encoded based on a same original frame. Each of the plurality of frames may be different versions encoded at different resolutions. The ingest service 104 may determine a sequence of frames of the content for each version. Generating a data object may comprise selecting the first frame from each of the sequences of frames. Each of the selected first frames may be added to the data object (e.g., by sequentially appending the frames). The next data object may be generated by selecting the next frame (e.g., next after the first frame) from each of the sequences of frames. In some scenarios, a group of frames may be selected and added to the data object. In other scenarios, only one frame from each version of the content (e.g., from each sequence) may be added to the data object.

The data object may comprise portions of a plurality of content segments. The data object may comprise one or more CMAF chunks, each comprising at least a portion of a content segment. Each content segment may comprise a sequence of frames at a corresponding resolution. Generating the data object may comprise generating the data object via an application layer process. Generating the data object may comprise generating CMAF chunks from different representations with same (e.g., for same switching sets, multiple resolutions of video) or similar (e.g., for different switching sets, video and audio) playback start and end times.

The ingest service 104 may be configured to generate a data object based on (e.g., by) generating one or more repair symbols for forward error correction. The one or more repair symbols may be comprised in (e.g., appended to) the data object. The one or more repair symbols may be generated based on a combination of the plurality of frames (e.g., that are corresponding versions of each other). The one or more repair symbols may be generated based on at least one frame from each of the different resolutions. The one or more repair symbols may comprise fountain codes.

The ingest service 104 may be configured to generate a data object based on (e.g., by) generating a header. The header may be comprised in (e.g., prepended to, at the beginning) the data object. The header may comprise an indication of a location in the data object of each frame of the plurality of frames. The header may comprise an indication of a location of the one or more repair symbols for forward error correction.

The ingest service 104 may be configured to generate a data object based on (e.g., by) generating additional information. The additional information may be comprised in the data object. The additional information may be in the data object if the data object is first in a sequence of a plurality of data objects (e.g., first in a segment, such as a 2 second content segment). The additional information may comprise manifest data indicating a sequence and locations for accessing a plurality content segments. The additional information may comprise advertisement information. The advertisement information may comprise locations of advertisements, advertisement events, or a combination thereof. The advertisement information may comprise Society of Cable and Telecommunications (SCTE) events (e.g., SCTE-35 event). The additional information may comprise other application-specific non-media events, such as interactivity events (e.g. score updates in a soccer game) or Ad-ID events defined by SVA (streaming video alliance). Additional information may comprise non-media metadata, such as MPEG DASH ARI tracks, timed metadata tracks, tracks carrying video quality information, a combination thereof, and/or the like.

The ingest service 104 may be configured to send the data object. The ingest service 104 may be configured to send the data object to a computing device associated with a content delivery and/or access network, such as storage service 106, the content service 108, or a combination thereof. The ingest service 104 may be configured to cause the plurality of data objects to be stored to by the storage service 106. The plurality of data objects may be caused to be stored in a directory, a logical location (e.g., location associated with a uniform resource identifier, such as a URL), and/or the like. The storage service 106 may be implemented via one or more storage devices. Multiple copies of the plurality of content objects may be stored on different storage devices at different geographic locations. Sending the data object and/or causing the object to be stored may comprise sending, via an unreliable protocol, the data object. The unreliable protocol may comprise User Datagram Protocol (UDP). Sending the data object may comprise sending, via a reliable protocol, the data object. The reliable protocol may comprise Transmission Control Protocol (TCP).

The content service 108 may be configured to manage the content stored by the storage service 106. The content service 108 may comprise one or more of a content server, an origin server, or an edge server. The content service 108 may be implemented as one or more servers of a content distribution network and/or content access network. The content service 108 may comprise a packaging service, such as a just in time packager, and/or the like. The content service 108 may be configured to receive requests for content from a plurality of users. The content may comprise video, audio, text, gaming data, a combination thereof, and/or the like. The content may comprise a plurality of content channels, such as live channels, streaming channels, cable channels, and/or the like. The content service 108 may comprise one or more servers.

The content service 108 may be configured to receive (e.g., or access from the storage service 106) the plurality of data objects (e.g., one or more, or each, comprising a plurality of frames of content associated with different versions of the content). In some scenarios, the storage service 106 and the content service 108 may be combined as a single service. The content service 108 may be configured to receive the plurality of data objects in response to a request (e.g., or other triggering action). If the content service 108 receives a request for a content segment, the content service 108 may request and/or access any data objects associated with the segment. The data objects may be processed to access the associated frames, which may be combined (e.g., appended one after the other) to generate the content segment.

The content service 108 (e.g., the packager) may be configured to generate (e.g., package, encode) one or more segments based on at least the data object. A plurality of data objects may be processed (e.g., unpackaged) to determine frames associated with a version of the content. The frames associated with the version of the content may be combined (e.g., grouped, appended, packaged) in to one or more content segments. A content segment may be a data file (e.g., a 2 second content segment) that is used for transmission of the content. The plurality of data objects may be processed (e.g., organized, reorganized) into a plurality of segments of the content. The segments may be sent to the user device 110, and the user device 110 may play back the segments.

The content service 108 may be configured to generate at least one content segment based on the plurality of data objects. Generating the at least one content segment may comprise generating, based on a request for the content from a computing device, the at least one content segment. Generating the at least one content segment may comprise generating the at least one content segment via an application layer process. The at least one content segment may comprise frames, from the plurality of data objects, associated with a same version of the content. All the frames of the content segment may be associated with the version of the content. Generating the at least one content segment may comprise determining a version of the content and selecting from each data object, of the plurality of data objects, a frame associated with the version of the content.

Generating the at least one content segment may comprise determining a header in a data object of the plurality of data objects. The header may comprise an indication of a location in the data object of each frame of the plurality of frames. The header may comprise an indication of a location of the one or more repair symbols for forward error correction. The content service 108 may use the information in the header to locate the relevant frame (e.g., or frames, if multiple) and/or repair symbols.

Generating the at least one content segment may comprise performing forward error correction based on one or more repair symbols in a data object of the plurality of data objects. The one or more repair symbols may be used for error correction of a combination of a plurality of frames of the data object. The one or more repair symbols may be generated based on at least one frame from each of the different resolutions in the data object. The one or more repair symbols may comprise fountain codes.

In some scenarios, the forward error correction may be performed on the entire data object. The forward error correction may be performed before the user request the content segment. For example, forward error correction may be performed upon receiving the data object (e.g., at the storage service 106, at the content service 108). Content segments may be generated upon receiving the data object (e.g., at the storage service 106, at the content service 108). The content segments may be stored (e.g., at the storage service 106, at the content service 108), and may be retrieved to process requests from user devices 110.

Generating the at least one content segment may comprise determining additional information in a data object of the plurality of data objects. The additional information may be in a data object first in a sequence of the plurality of data objects. The additional information may comprise manifest data indicating a sequence and locations for accessing a plurality content segments. The additional information may comprise advertisement information. The advertisement information may comprise one or more of locations of advertisements or advertisement events. The advertisement information may comprise Society of Cable and Telecommunications (SCTE) events (e.g., SCTE-35 event). The additional information may comprise non-media events.

The content service 108 may be configured to send the at least one content segment. The content service 108 may be configured to send the at least one content segment to a computing device. The computing device may comprise a device external to the content delivery network. The computing device may comprise the user device 110. The computing device may comprise another device in the content delivery network. Sending the at least one content segment may comprise sending the at least one content segment based on the request from the computing device.

The user device 110 may be configured to receive the content (e.g., as one or more content segments) from one or more of the content service 108 or the storage service 106. The user device 110 may comprise a computing device, smart device (e.g., smart glasses, smart watch, smart phone), a mobile device, a tablet, a computing station, a laptop, a digital streaming device, a set-top box, a streaming stick, a television, and/or the like.

The user device 110 may be configured to receive the content via a communication unit. The communication unit may comprise a modem, network interface, and/or the like configured for communication via the network 112. The user device 110 may comprise a user interface unit. The user interface unit may be configured to cause display of a user interface. The user interface may be configured to allow the user to browse available content, such as content sent by the content service 108, content stored by the storage service 106, and/or the like. The user interface may be configured to allow users to request content, such as a content channel (e.g., or a content asset being supplied via a content channel), be stored (e.g., recorded) for later viewing. The user interface may be configured to cause storage of the content based on a configuration setting, such as a buffering setting associated with buffering content in storage (e.g., if a user begins watching a channel, if a rule is triggered, if the user is predicted to request the content at a time time).

Figure 2A:
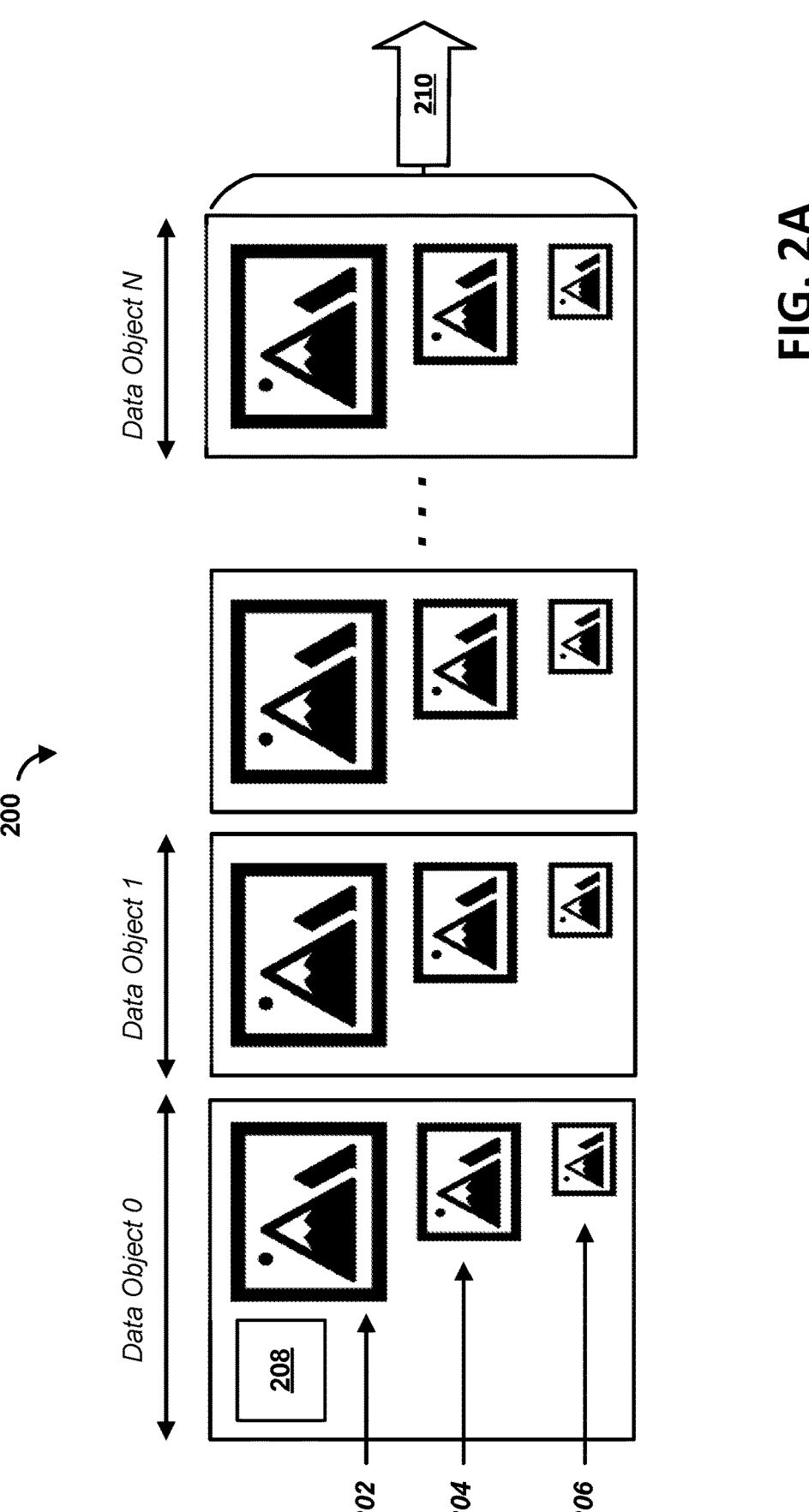
FIG. 2A shows example content.

FIG. 2A shows example content 200. The content 200 may comprise a plurality of data objects (e.g., or shards), such as data object 0), data object 1, and data object N. The data objects may be generated (e.g., determined, encoded) by a computing device, such as the ingest service 104 of FIG. 1. Content (e.g., or data chunks of the content) may be encoded into a plurality of versions, such as a first version 202, a second version 204, a third version 206, and/or the like. A version may comprise a representation of the content at a specific resolution. The first version 202 may represent the content at a first resolution (e.g., 2160$p$). The second version 204 may represent the content at a second resolution (e.g., 1080p). The third version 206 may represent the content at a third resolution (e.g., 540$p$). Each of the first, second, and third resolutions may be different from each other. A data object may comprise at least one frame (e.g., a single frame, a group of frames, a group of frames less than a full content segment) from each of the first version 202, the second version 204, and the third version 206

A frame of content may be decoded and used to generate a plurality of frames at different resolutions. The plurality of frames may be used to create the data object. As an illustration, an encoder may generate frames in sequence (e.g., each frame of the original content may be decoded and sent into encoder software/hardware) for output as one or more frames. The encoder may generate access units (e.g., a sequence of NAL units) in case of MPEG codecs such as AVC, HEVC, and VVC. If the encoder is a multi-rate encoder encoding multiple bitrates, the encoder may generate a frame per each resolution. Audio frames may also be generated. The service (e.g., a packager) creating the data objects may receive the access units (e.g., frames), group the access units (e.g., frames), and/or encapsulate the access units (e.g., frames) in a container (e.g., in case of DASH-IF live ingest, ISO-BMFF) to create a data object. This service may be a part of the encoder software (e.g. is a library used by the encoder software).

At least one of the data objects may comprise additional information 208. The additional information may be comprised in the first data object, such as data object 0. The additional information may comprise manifest data indicating a sequence and locations for accessing one or more content segments. The additional information may comprise advertisement information. The advertisement information may comprise one or more of locations of advertisements or advertisement events. The advertisement information may comprise Society of Cable and Telecommunications (SCTE) events (e.g., SCTE-35 event). The additional information may comprise non-media events. The plurality of data objects may be sent (e.g., sequentially) via a connection 210. The connection 210 may be a reliable connection, such as a transmission control protocol connection.

Figure 2B:
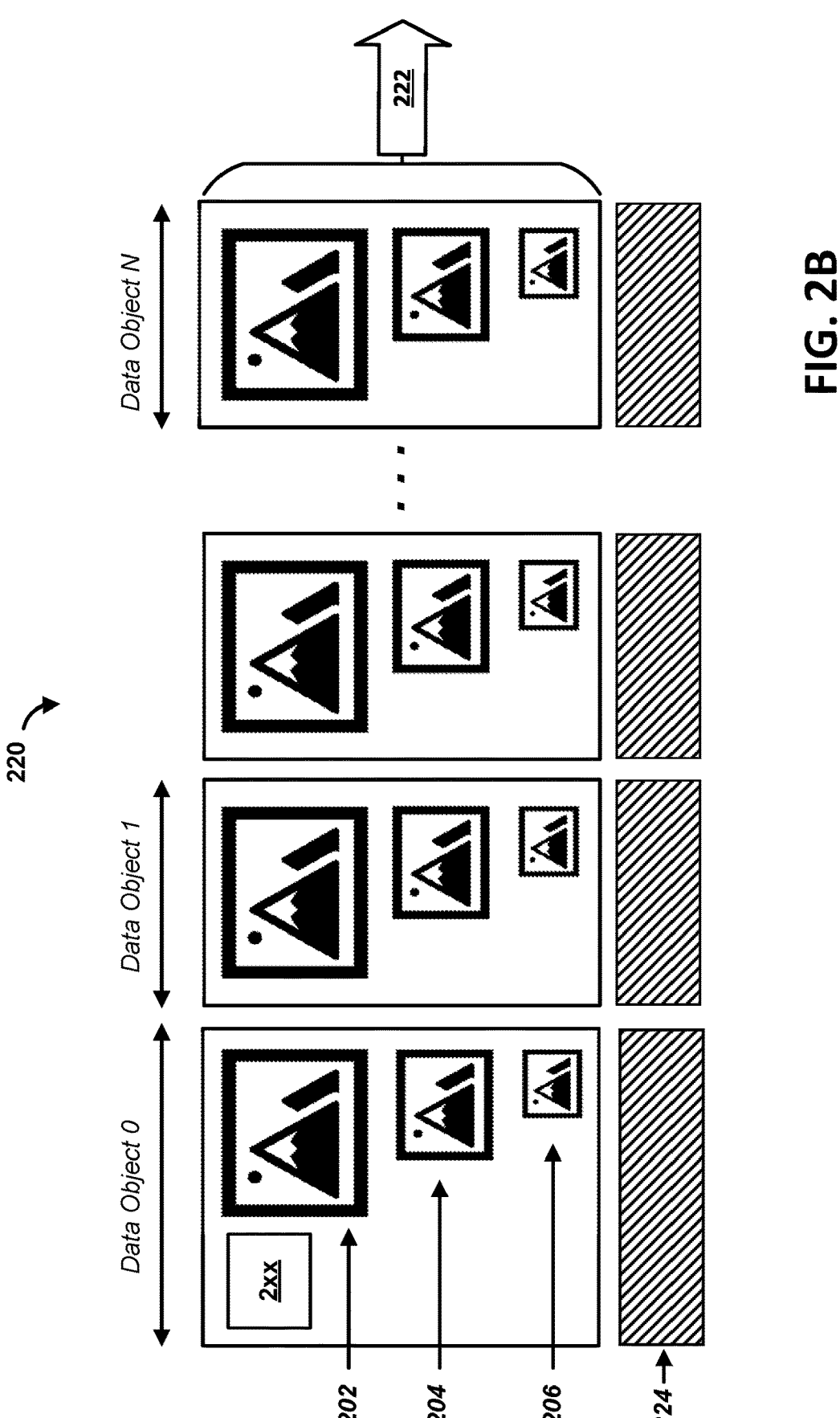
FIG. 2B shows example content.

FIG. 2B shows example content 220. The example content 220 of FIG. 2B may include any combination of the features of the content 200 of FIG. 2A. The connection 222 (e.g., transmission) may be an unreliable connection, such as a UDP con. Each of the plurality of data objects may also comprise forward error correction data 224. The forward error correction data 224 may comprise one or more repair symbols for forward error correction. The one or more repair symbols may be comprised in (e.g., appended to) the data object. The one or more repair symbols may be generated based on a combination of the frames of the data object (e.g., that may be corresponding versions of each other). The one or more repair symbols may comprise fountain codes.

This disclosed techniques include "segment sharding." in which data chunks (e.g., frames, groups of frames) from multiple representations with same or similar (e.g., within a threshold time separation) presentation times (e.g., corresponding to the same content, from the same time stamp of a content stream) may be combined together in a single data object. There are several ways of achieving this result.

The data chunks (e.g., one or multiple frames of a content segment for version of content) from different versions of content may be combined (e.g., concatenated) together. If the data chunks are syntactically conforming to ISO-BMFF fragment definition, then a receiving device (e.g., content service 108) may process (e.g., examine) each Movie Fragment ('moof) and/or Movie Data ('mdat') box of one or more data objects to map the chunks to their corresponding representations.

In some scenarios, representations (e.g., versions) may be explicitly indicated (e.g., indicating a location) in a box and/or field located within the 'moof box. This can be achieved by adding a box and/or field describing the representation ID, adaptation set ID, and Period ID of the representation to which the chunk belongs. Another option would be including an expression in the W3C XPath language pointing to the correct representation. In the latter case, the manifest presentation description (MPD) publish time may be included in the XPath expression in order to ensure that the expression is applied to the correct version of the MPD. In both cases, an MPD ID may be included as well. In this case, the receiving device (e.g., ingest service 104) many only process (e.g., examine) the above signaling and will not need to perform additional parsing of, for example, sample description and the 'mdat' box.

In some scenarios, an additional data structure (e.g., an ISO-BMFF box named Shard Header) may be added in the beginning of a data object (e.g., or segment shard) comprising multiple representations of content. The data object may be the first data object in a sequence of a data objects. The additional data structure may comprise an index for combining data from multiple data objects into a single representation. The index may comprise the same identifier information described above. The index may comprise byte offsets to the data chunks within the data objects. For example, a data object may include data for a first representation (e.g., or first version) in a first range of bytes of the data object, data for a second representation (e.g., or second version) in a second range of bytes of the data object, data for a third representation (e.g., or third version) of the content in a third range of bytes of the data object, and so forth. The index may indicate byte offsets for locating the data (e.g., chunk) relevant to the specific representation within a data object. The additional data structure may comprise separate indexes for each representation stored the data object. The index may comprise sequence numbers and/or timestamps of the data (e.g., chunk) for each representation. In this case, the receiving device (e.g., the ingest service 104) may only need to process the additional data structure (e.g., the ISO-BMFF box and/or other field/file/ container in the first data object in a sequence of data objects), identify the corresponding representations in the corresponding manifest file (e.g., an MPD generated when the versions of content were generated, before storing data chunks in data objects), and output the bytes from the byte ranges indicated in the index(es) into files (e.g., segment files) named according to a template.

In some scenarios, the additional data structure (e.g., the box) may contain the name of a compression algorithm used to compress all following data (e.g., chunks). The byte offsets may still reference a pre-compression object. This way, the receiving device may receive a data object, parse the additional data structure (e.g., the Shard Header), and un-compress the chunks. The same processing as in the above paragraph may be applied following this processing.

Figure 3:
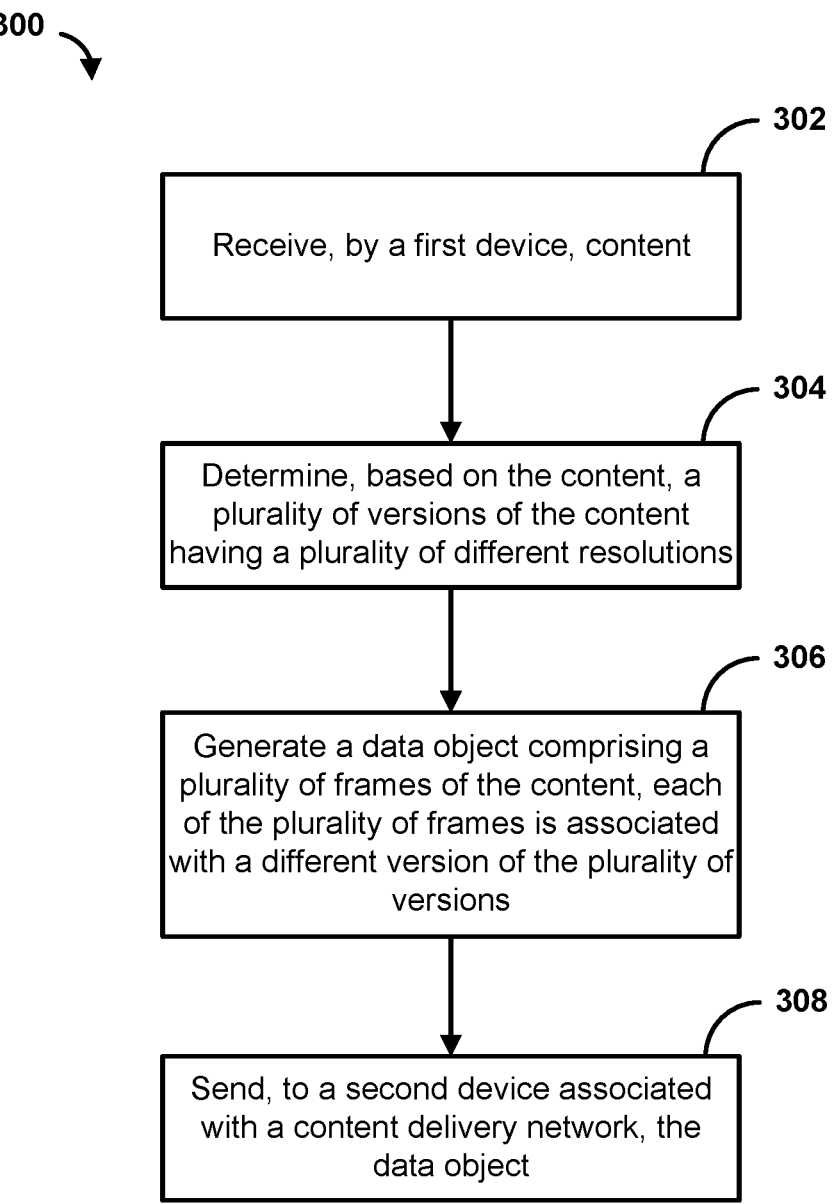
FIG. 3 shows an example method.

FIG. 3 shows an example method. The method 300 may comprise a computer implemented method for providing a service (e.g., a media service, content service). A system and/or computing environment, such as the system 100 of FIG. 1 and/or the computing environment of FIG. 6, may be configured to perform the method 300. The method 300 may be performed in connection with the premises and/or system illustrated in FIG. 1, FIG. 2A and FIG. 2B. Any of the features of the methods of FIGS. 4-5 may be combined with any of the features and/or steps of the method 300 of FIG. 3.

At step 302, content may be received. The content may be received by a first device. The first device may comprise a transcoder. The content may comprise one or more of media content, video, audio, or text. The content may be received from a source device. The content may be received for distribution to users via a content and/or access delivery network.

At step 304, a plurality of versions of the content having a plurality of different resolutions may be determined (e.g., generated, encoded). The plurality of versions of the content having the plurality of different resolutions may be determined (e.g., generated, encoded) based on the content. The plurality of different resolutions may comprise one or more of standard definition (e.g., 480p), high definition (e.g., 720p. 1080p), or ultra high definition (e.g., 4k). The plurality of versions of the content may comprise a plurality of representations of an adaptation set of a content stream. Each representation may correspond to a different resolution.

At step 306, a data object comprising a plurality of frames may be generated (e.g., determined, encoded). The plurality of frames may be frames of the content received in step 302. The frames may be determined (e.g., generated, encoded) from the content in step 304. The data object may be generated by the first device. The data object may comprise at least one frame (e.g., multiple frames less including than a segment, multiple frames including more than a segment), of the plurality of frames, for each version of the plurality of versions of the content. Each of the plurality of frames may be associated with (e.g., represent, correspond to, encoded based on) a different version of the plurality of versions. A data object may comprise different sections (e.g., defined by byte ranges) for storing the frames (e.g., or other data chunk) for different versions, such as a first section (e.g., first byte range) for frames (e.g., or other data chunk) of a first version and a second section (e.g., second byte range) for frames (e.g., or other data chunk) of a second version different than the first version. The plurality of frames may be grouped (e.g., selected) based on time. Each of the plurality of frames may be associated with one or more of the same time-point, time window; or content stream time. Each of the plurality of frames may be encoded based on a same original frame. Each of the plurality of frames may be different versions encoded at different resolutions. The data object may comprise portions of a plurality of content segments. Each content segment may comprise a sequence of frames at a corresponding resolution.

Generating the data object may comprise generating the data object via an application layer process. Generating the data object may comprise generating one or more repair symbols for forward error correction. The one or more repair symbols may be comprised in (e.g., appended to, stored in) the data object. The one or more repair symbols may be generated based on a combination of the plurality of frames. The one or more repair symbols may be generated based on at least one frame from each of the different resolutions. The one or more repair symbols may comprise fountain codes.

Generating the data object may comprise generating a header. The header may be comprised in (e.g., prepended to, at the beginning, stored in) the data object. The header may comprise an indication of a location in the data object of each frame of the plurality of frames. The header may comprise an indication of a location of the one or more repair symbols for forward error correction. Generating the data object may comprise generating additional information. The additional information may be comprised in the data object. The additional information may be in the data object if the data object is first in a sequence of a plurality of data objects. The additional information may comprise manifest data indicating a sequence and locations for accessing a plurality content segments. The additional information may comprise advertisement information. The advertisement information may comprise one or more of locations of advertisements or advertisement events. The advertisement information may comprise Society of Cable and Telecommunications (SCTE) events (e.g., SCTE-35 event). The additional information may comprise non-media events.

At step 308, the data object may be sent. The data object may be sent to a second device associated with a content delivery network. The second device may comprise one or more of a content server, an origin server, or an edge server. The second device may comprise a packager configured to generate a segment based on at least the data object. Sending the data object may comprise sending, via an unreliable protocol, the data object. The unreliable protocol may comprise User Datagram Protocol (UDP). Sending the data object may comprise sending, via a reliable protocol, the data object. The reliable protocol may comprise Transmission Control Protocol (TCP).

Figure 4:
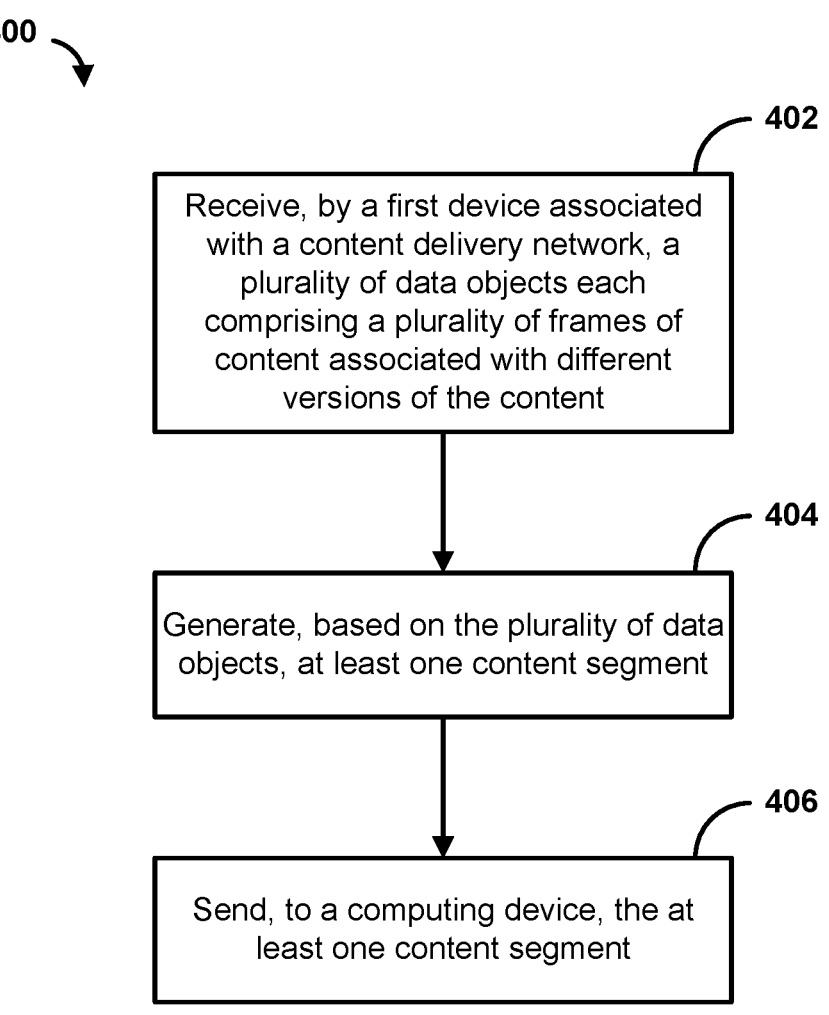
FIG. 4 shows an example method.

FIG. 4 shows an example method. The method 400 may comprise a computer implemented method for providing a service (e.g., a media service, a network service, a screening service, a filtering service). A system and/or computing environment, such as the system 100 of FIG. 1 and/or the computing environment of FIG. 6, may be configured to perform the method 400. The method 400 may be performed in connection with the premises and/or system illustrated in FIG. 1, FIG. 2A and FIG. 2B. Any of the features of the methods of FIG. 3 and FIG. 5 may be combined with any of the features and/or steps of the method 400 of FIG. 4.

At step 402, a plurality of data objects may be received. Each of the plurality of data object may comprise a plurality of frames of content. Each data object may comprise at least one frame, of the plurality of frames, for each version of a plurality of versions of the content. Each frame may be associated with a corresponding version of the plurality of versions of the content. A data object may comprise different sections (e.g., defined by byte ranges) for storing the frames for different versions, such as a first section (e.g., first byte range) for frames (e.g., or other data chunk) of a first version and a second section (e.g., second byte range) for frames (e.g., or other data chunk) of a second version different than the first version. The plurality of data objects may be received by a first device (e.g., first computing device, first computing node) associated with a content delivery network. The first device may comprise one or more of a content server, an origin server, or an edge server. The plurality of data objects may be received from a second device associated with a content delivery network. The second device may comprise a transcoder (e.g., encoder).

The content may comprise one or more of media content, video, audio, or text. Each version of the content may be encoded at a different resolution of a plurality of resolutions. The plurality of resolutions may comprise one or more of standard definition (e.g., 480p), high definition (e.g., 720p, 1080p), or ultra high definition (e.g., 4k). The plurality of versions of the content may comprise a plurality of representations of an adaptation set of a content stream. The plurality of frames of a data object may be grouped based on time. Each of the plurality of frames of the data object may be associated with one or more of the same time-point, time window; or content stream time. Each of the plurality of frames of the data object may be encoded based on a same original frame. Each of the plurality of frames of the data object may be different versions encoded at different resolutions. Receiving the data object may comprise receiving, via an unreliable protocol, the data object. The unreliable protocol may comprise User Datagram Protocol (UDP). Receiving the data object may comprise receiving, via a reliable protocol, the data object. The reliable protocol may comprise Transmission Control Protocol (TCP).

At step 404, at least one content segment may be generated (e.g., or determined). The at least one content segment may be generated by the first device. The at least one content segment may be generated based on the plurality of data objects. Generating the at least one content segment may comprise generating, based on a request for the content from a computing device (e.g., user device), the at least one content segment. Generating the at least one content segment may comprise generating the at least one content segment via an application layer process. The at least one content segment may comprise frames, from the plurality of data objects, associated with a same version of the content. All the frames of the content segment may be associated with the version of the content. Generating the at least one content segment may comprise determining a version of the content and selecting from each data object, of the plurality of data objects, a frame associated with the version of the content. Frames in the data objects not associated with the version may not be used to generate the content segment.

Generating the at least one content segment may comprise performing forward error correction based on one or more repair symbols in a data object of the plurality of data objects. The one or more repair symbols may be used for error correction of a combination of a plurality of frames of the data object. The one or more repair symbols may be generated based on at least one frame from each of the different resolutions in the data object. The one or more repair symbols may comprise fountain codes.

Generating the at least one content segment may comprise determining a header in a data object of the plurality of data objects. The header may comprise an indication of a location in the data object of each frame of the plurality of frames. The header may comprise an indication of a location of the one or more repair symbols for forward error correction. Generating the at least one content segment may comprise determining additional information in a data object of the plurality of data objects. The additional information may be in a data object first in a sequence of the plurality of data objects. The additional information may comprise manifest data indicating a sequence and locations for accessing a plurality content segments. The additional information may comprise advertisement information. The advertisement information may comprise one or more of locations of advertisements or advertisement events. The advertisement information may comprise Society of Cable and Telecommunications (SCTE) events (e.g., SCTE-35 event). The additional information may comprise non-media events.

At step 406, the at least one content segment may be sent. The at least one content segment may be sent to a computing device. The computing device may comprise a device external to the content delivery network. The computing device may comprise a user device. The computing device may comprise another device in the content delivery network. Sending the at least one content segment may comprise sending the at least one content segment based on the request from the computing device.

Figure 5:
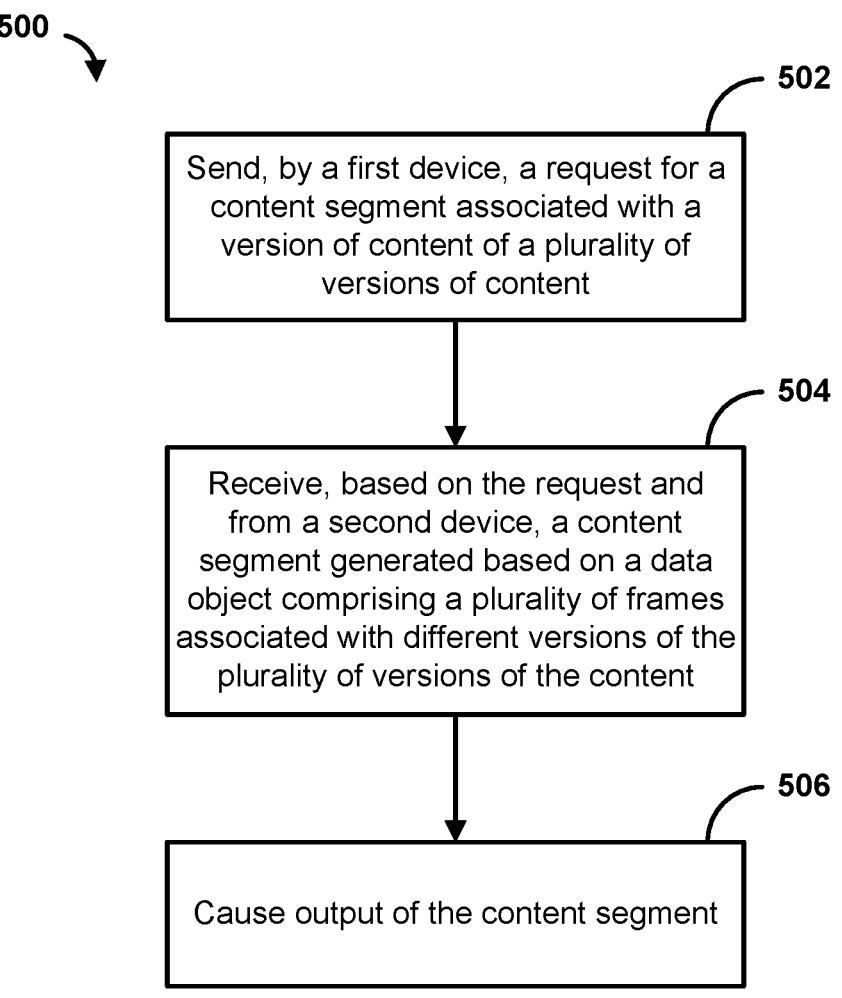
FIG. 5 shows an example method.

FIG. 5 shows an example method. The method 500 may comprise a computer implemented method for providing a service (e.g., a media service, content service). A system and/or computing environment, such as the system 100 of FIG. 1 and/or the computing environment of FIG. 6, may be configured to perform the method 500. The method 500 may be performed in connection with the premises and/or system illustrated in FIG. 1, FIG. 2A and FIG. 2B. Any of the features of the methods of FIG. 3 and FIG. 4 may be combined with any of the features and/or steps of the method 500 of FIG. 5.

At step 502, a request for a content segment associated with a version of content of a plurality of versions of content may be sent. The request for the content segment may be sent by a first device (e.g., first computing device). The first device may comprise one or more of a user device, a device external to a content delivery network, or a device in a content delivery network. Sending the request may comprise sending the request to a second device (e.g., second computing device) associated with a content delivery network. The second device may comprise one or more of a content server, an origin server, or an edge server. The content may comprise one or more of media content, video, audio, or text. The plurality of versions may comprise a plurality of versions of the content each having a different resolution of a plurality of resolutions. The plurality of resolutions may comprise one or more of standard definition (e.g., 480p), high definition (e.g., 720p, 1080p), or ultra high definition (e.g., 4k). The plurality of versions of the content may comprise a plurality of representations of an adaptation set of a content stream.

At step 504, the content segment may be received. The content segment may be received by the first device. The content segment may be received based on (e.g., in response to) the request. The content segment may be received from the second device. The content segment may be based on (e.g., generated based on, received based on, decoded based on) a data object comprising a plurality of frames. The content segment may be generated based on (e.g., in response to) the request. The data object may comprise at least one frame, of the plurality of frames, for each version of the plurality of versions of the content. Each of the plurality of frames may be associated with a different version of the plurality of versions of the content. A data object may comprise different sections (e.g., defined by byte ranges) for storing the frames (e.g., or other data chunk) for different versions, such as a first section (e.g., first byte range) for frames (e.g., or other data chunk) of a first version and a second section (e.g., second byte range) for frames (e.g., or other data chunk) of a second version different than the first version. The plurality of frames may be grouped based on time. Each of the plurality of frames (e.g., in a single data object) may be associated with one or more of the same time-point, time window, or content stream time. Each of the plurality of frames may be encoded based on a same original frame. Each of the plurality of frames may be different versions encoded at different resolutions. The data object may comprise portions of a plurality of content segments. Each content segment may comprise a sequence of frames at a corresponding resolution.

The data object may be based on (e.g., generated based on, received based on) an application layer process. The data object may comprise one or more repair symbols for forward error correction. The one or more repair symbols may comprise repair symbols based on (e.g., generated based on) a combination of the plurality of frames. The one or more repair symbols may comprise repair symbols generated based on at least one frame from each of the different resolutions. The one or more repair symbols may comprise fountain codes.

The data object may comprise a header. The header may comprise an indication of a location in the data object of each frame of the plurality of frames. The header may comprise an indication of a location of the one or more repair symbols for forward error correction. The data object may comprise additional information. The additional information may be in a data object first in a sequence of a plurality of data objects. The additional information may comprise manifest data indicating a sequence and locations for accessing a plurality content segments. The additional information may comprise advertisement information. The advertisement information may comprise one or more of locations of advertisements or advertisement events. The advertisement information may comprise Society of Cable and Telecommunications (SCTE) events (e.g., SCTE-35 event). The additional information may comprise non-media events.

At step 506, output of the content segment may be caused (e.g., by the first device). Causing output may comprise causing the content segment to be sent via a communication link, network, and/or the like. Causing output may comprise causing the content segment to be stored in a location. Causing output of the content segment may comprise one or more of rendering the output via a display, sending the content segment to a display, outputting the content segment via a content player, and/or the like.

Figure 6:
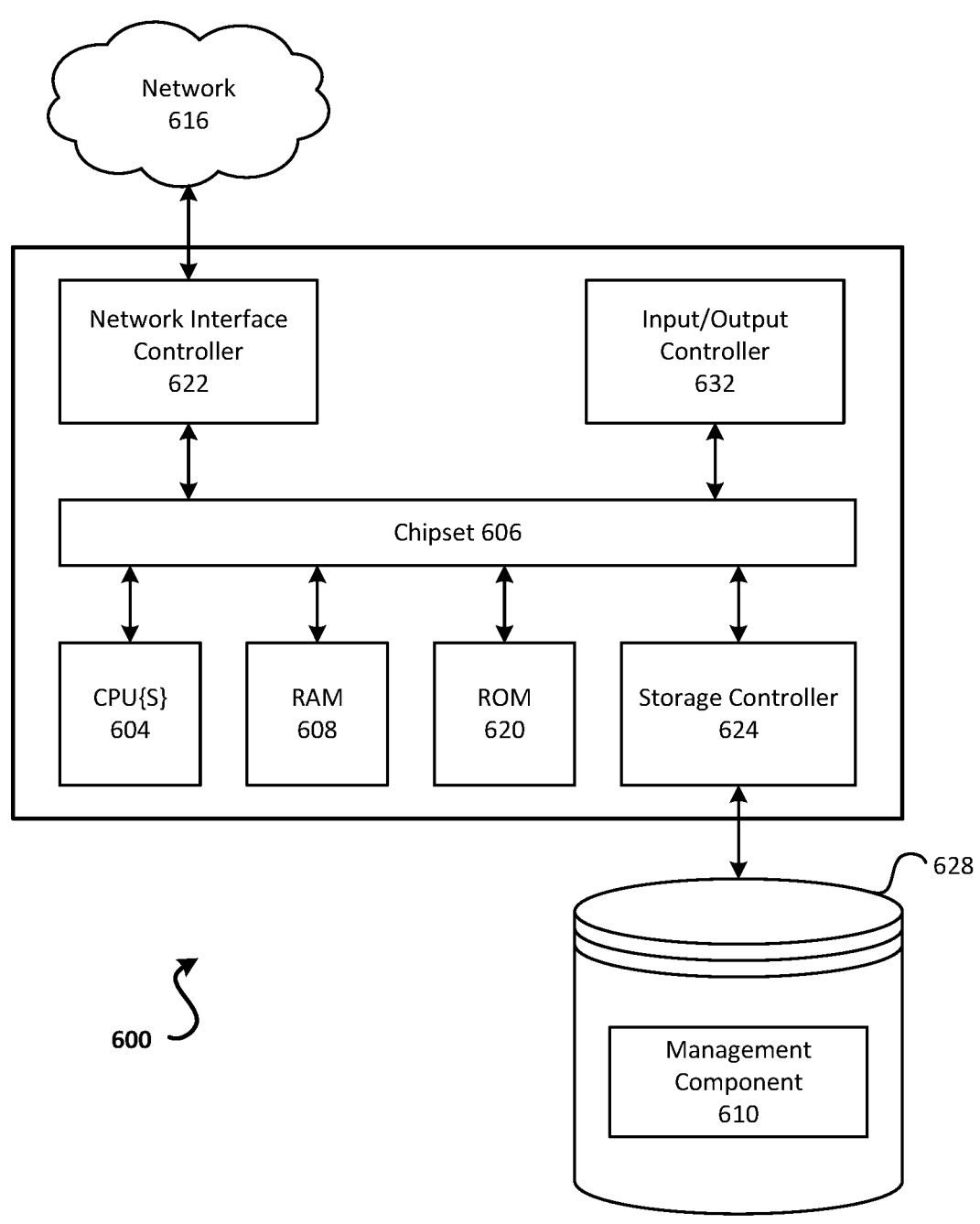
FIG. 6 shows an example computing device.

FIG. 6 depicts a computing device that may be used in various aspects, such as the servers, modules, and/or devices depicted in FIG. 1. With regard to the example architecture of FIG. 1, the content source 102, ingest service 104, storage service 106, content service 108, and/or user device 110 may each be implemented as one or more instances of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 2A, FIG. 2B, FIG. 4, FIG. 5, and/or FIG. 6.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described above, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described above. The computing device 600 may have access to computer-readable storage media storing computer-executable instructions, which, when executed by the computing device 600, may perform the methods described in relation to FIG. 2A, FIG. 2B, FIG. 3, FIG. 4, and/or FIG. 5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

The term "or" when used with "one or more of" is used in its inclusive sense (and not in its exclusive sense) so that when used, for example, to connect a list of elements, the term "or" means one, some or all of the elements in the list. The term "or" when used with "at least one of" is used in its inclusive sense (and not in its exclusive sense) so that when used, for example, to connect a list of elements, the term "or" means one, some or all of the elements in the list. For example, the phrases "one or more of A, B, or C" includes any of the following: A, B, C, A and B, A and C, B and C, and A and B and C. Similarly the phrase "one or more of A, B, and C" includes any of the following: A, B, C, A and B, A and C, B and C, and A and B and C. The phrase "at least one of A, B, or C" includes any of following: A, B, C, A and B, A and C, B and C, and A and B and C. Similarly, the phrase "at least one of A, B, and C" includes any of following: A, B, C, A and B, A and C, B and C, and A and B and C.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks. CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, by a first device, content;
   determining, based on the content, a plurality of versions of the content having a plurality of different resolutions;
   generating a data object comprising a plurality of frames of the content, wherein the data object comprises at least one frame, of the plurality of frames, for each version of the plurality of versions of the content; and
   sending, to a second device associated with a content delivery network, the data object.

2. The method of claim 1, wherein the plurality of versions of the content comprises a plurality of representations of an adaptation set of a content stream.

3. The method of claim 1, wherein the data object comprises portions of a plurality of content segments, wherein each content segment comprises a sequence of frames at a corresponding resolution.

4. The method of claim 1, wherein generating the data object comprises generating the data object via an application layer process.

5. The method of claim 1, wherein generating the data object comprises generating one or more repair symbols for forward error correction.

6. The method of claim 1, wherein the second device comprises a packager configured to generate a segment based on at least the data object.

7. The method of claim 1, wherein sending the data object comprises sending, via an unreliable protocol, the data object.

8. A method comprising:
   receiving, by a first device associated with a content delivery network, a plurality of data objects each comprising a plurality of frames of content, wherein each data object comprises at least one frame, of the plurality of frames, for each version of a plurality of versions of the content, and wherein each version of the content is encoded at a different resolution of a plurality of resolutions;
   generating, based on the plurality of data objects, at least one content segment, wherein the at least one content segment comprises frames, from the plurality of data objects, associated with a same version of the content; and
   sending, to a computing device, the at least one content segment.

9. The method of claim 8, wherein the plurality of versions of the content comprises a plurality of representations of an adaptation set of a content stream.

10. The method of claim 8, wherein receiving the plurality of data objects comprises receiving, via an unreliable protocol, the plurality of data objects.

11. The method of claim 8, wherein generating the at least one content segment comprises generating, based on a request for the content from the computing device, the at least one content segment.

12. The method of claim 8, wherein generating the at least content one segment comprises generating the at least one content segment via an application layer process.

13. The method of claim 8, wherein generating the at least one content segment comprises determining a version of the content and selecting from each data object, of the plurality of data objects, a frame associated with the version of the content.

14. The method of claim 8, wherein generating the at least one content segment comprises performing forward error correction based on one or more repair symbols in a data object of the plurality of data objects.

15. A method comprising:
   sending, by a first device, a request for a content segment associated with a version of content of a plurality of versions of content;
   receiving, based on the request and from a second device, the content segment, wherein the content segment is generated based on a data object comprising a plurality of frames, wherein the data object comprises at least one frame, of the plurality of frames, for each version of the plurality of versions of the content; and
   causing output of the content segment.

16. The method of claim 15, wherein the plurality of versions of the content comprises a plurality of representations of an adaptation set of a content stream.

17. The method of claim 15, wherein the data object comprises portions of a plurality of content segments, wherein each content segment of the plurality of content segments comprises a sequence of frames at a corresponding resolution.

18. The method of claim 15, wherein the data object is generated based on an application layer process.

19. The method of claim 15, wherein the data object comprises one or more repair symbols for forward error correction.

20. The method of claim 15, wherein causing output of the content segment comprises one or more of rendering the output via a display, sending the content segment to a display, outputting the content segment via a content player.

\* \* \* \* \*